United States Patent [19]
Krönert

[11] 4,296,853
[45] Oct. 27, 1981

[54] ROTATION-ELASTIC, SHOCK AND VIBRATION DAMPING CLUTCH

[75] Inventor: Curt Krönert, Mülheim, Fed. Rep. of Germany

[73] Assignee: Thyssen Industrie AG, Fed. Rep. of Germany

[21] Appl. No.: 85,220

[22] Filed: Oct. 16, 1979

[30] Foreign Application Priority Data

Oct. 14, 1979 [DE] Fed. Rep. of Germany ....... 2844849

[51] Int. Cl.$^3$ .............................................. F16D 3/68
[52] U.S. Cl. ................................................. 192/106.1
[58] Field of Search ................. 192/106.1; 64/27 NM, 64/27 R, 1 V; 74/574

[56] References Cited

U.S. PATENT DOCUMENTS 4,164,877 8/1979 Chivari ........................... 64/27 NM Primary Examiner—George H. Krizmanich
Attorney, Agent, or Firm—McGlew and Tuttle

[57] ABSTRACT

A rotation-elastic, shock and vibration damping clutch, comprises, an outer ring part with an inner ring part arranged within the outer ring part and with each ring having a generally axially extending aperture therethrough at a plurality of circumferentially spaced locations. An elastic pressure pad of arc-shaped cross-section extends between the inner and outer ring portions and has respective ends abutting against the respective sides of the ring portions around each of the apertures. At least one non-elastic rope extends through the elastic pressure pad and is advantageously embedded therein and it extends through each of the apertures and is evenly distributed around the circumference of the rings. Each ring is held by a spring member at its passage through the apertures, which spring member is located in a recess defined on the opposite side of the ring from the elastic pad.

7 Claims, 7 Drawing Figures

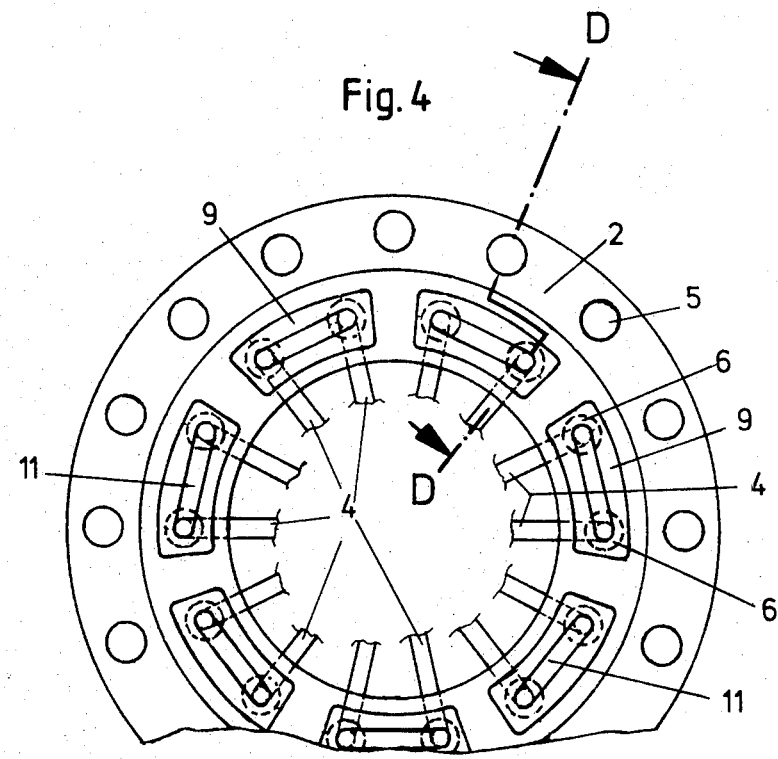
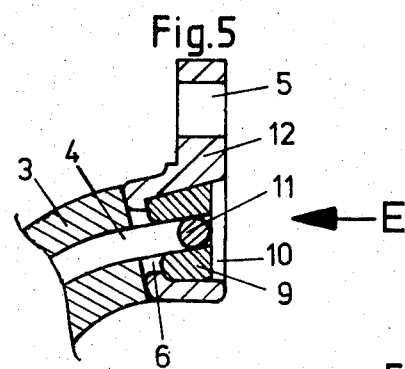
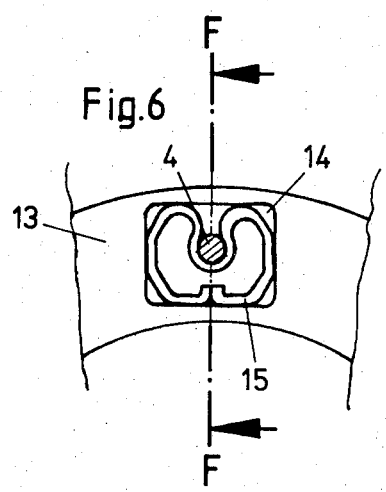
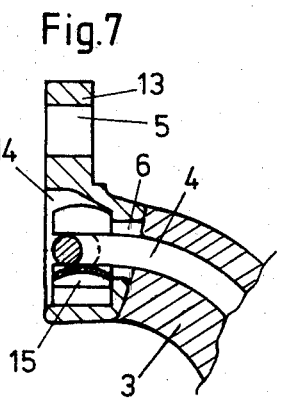

ROTATION-ELASTIC, SHOCK AND VIBRATION DAMPING CLUTCH

FIELD AND BACKGROUND OF THE INVENTION

This invention relates to clutches in general and, in particular, to a new and useful rotation-elastic, shock and vibration damping clutch in which two clutch rings are connected by a rubber-elastic pressure pad of arc-shaped cross-section and by at least one rope strand of a non-elastic connecting rope which is evenly distributed over the circumference of the clutch and connected to the pressure pad.

One of the two clutch rings, usually the inner one, is connected to the driving shaft of a machine and the other, usually the outer clutch ring, is connected to the shaft to be driven. The job of the connecting ropes, or their rope strands, is to transmit the torque from the one clutch ring to the other, while the rubber-elastic pressure pad supports the rope strands, particularly influencing the rotation elasticity and the vibration damping of the clutch.

A clutch of this kind is known from German Pat. No. 23 18 612, in which the pressure pad comprises an elastic shell filled with a pressure medium, with non-elastic plastic ropes being led around the pressure pad or embedded in it. Among others, this clutch has the disadvantage that its rotation elasticity depends to a considerable extent on the pressure of the pressure medium filling the pressure pad. Apart from unpreventable leakage losses, the internal pressure of the pressure pad changes in the course of operation due to temperature fluctuations to which the clutch is subjected, so that the rotation elasticity of the clutch is also subject to considerable variations.

Another clutch of this kind is known from German Pat. No. 26 26 414. It differs in essence from the above-mentioned clutch in that the pressure pad is not filled with a pressure medium, but instead consists of a rubber part of stable shape with a jacket-shaped annular space open towards one side in the axial direction.

The two above-mentioned clutches have, in common, that the elasticity of the clutch is essentially determined by the elasticity of the pressure pad while the ropes, led through openings in the clutch rings connected by the pressure pad and fixed in the clutch rings, contribute to the shock and vibration attenuation of the clutch merely by the rope strands being supported by the arched pressure pad. If only for reasons of design, the result is a considerable flexural stiffness of the clutch rings because their fastening to the shafts to be connected by the clutch requires certain minimum dimensions which, in the outer ring for instance, are determined essentially by the number of, and diameter of, the connecting screws required, and by the openings required for the connecting ropes.

For example, the ratio of the outer clutch ring stiffness to the stiffness of the rope strands is about 10,000:1 in such clutches. It, therefore, follows that differences in the length of the rope strands automatically result in their also being stressed differently. Since the connecting ropes or rope strands contact the walls and edges of the openings through which they are led, they are bent sharply at the hole edges when the clutch is stressed by shocks and torque variations and are easily damaged due to the notch effect occurring thereby.

In German Pat. No. 26 57 527, a rotation-elastic clutch is suggested in which the last-named disadvantage is avoided by providing that the openings in which the connecting ropes are fastened to the clutch rings are provided with bushings or coatings, in particular, plastic bushings or coatings. These bushings or coatings are to have the effect of enabling the ropes or rope strands to glide in the openings without much friction so as to avoid edge contusions. It has turned out, however, that rope damage, due to severe rope bending at the hole edges cannot be eliminated by these known measures, and that rope breakage due to the notch effect at the hole edges still occurs at great torque variations.

SUMMARY OF THE INVENTION

The present invention provides an improvement of the lead-through and the seating of the ropes or rope strands through the openings or at the rope deflection points therein, so that the radial flexibility of the rope linkages to the clutch ring matches the elastic behavior of the connecting ropes to the greatest possible extent, and that rope breakages at the hole edges or the rope deflection points are precluded.

Starting from the last-mentioned prior art clutch, the solution of this problem consists in that the openings for the ropes in the clutch rings are so big that the rope strands do not contact the opening walls even at the greatest possible clutch torsion angle, and that each rope strands is mounted to at least one of the two clutch rings in the area of the opening so as to yield elastically in radial directions by means of spring parts.

The connecting rope or rope strand mounting, according to the invention, achieves the particular advantage that the spring parts make an unimpeded length equilization of the rope strands possible, so that, ultimately, all rope strands participate evenly in the power transmission. Another advantage lies in the gentle rope stress at the elastically yielding rope mountings and in the larger openings for the rope to pass through, which prevent rope kinking at the rope deflection points at wide clutch torsion angles.

In the two first-named clutches of German Pat. Nos. DE-OS 23 18 612 and 26 26 414, as well as in the clutches known from German Pat. Nos. 22 14 093 and 22 55 680 and DE-AS 22 51 236, the flexural stiffness of the outer clutch ring is utilized to achieve uniform participation of all reinforcing inserts, such as connecting ropes, strings, and string packets. It has turned out, however, that the unavoidable length difference of the connecting ropes or of the string inserts similar to the ropes cannot be equalized by the flexural stiffness of the clutch rings so that the connecting ropes or strings are stressed differently. Particularly in the three last-named designs, in which the strings lie next to, and on top of each other, rope or string breakages occur at least partly due to the sharp deflections of these reinforcing inserts, particularly, at the outer clutch ring. In these clutches, where single strings are distributed over the entire circumference, or arranged in sectors, clutch rings, resistant to bending are indispensable, and the above-mentioned disadvantages must be tolerated.

On the other hand, it was found that in runctiform rope linkages, such as known from German Pat. Nos. 23 18 612, 26 26 414 and 26 57 527, the rope linkage points may be flexible in radial directions, and this knowledge has led to the present invention.

The present invention consciously forgoes the stiffness of the clutch rings in the area of the lead-through of each connecting rope strand through the respective clutch ring, and due to the inventive arrangement of spring parts for the rope mounting, the desired uniform participation of each rope strand in the power transmission is actually achieved. Added to this are both a favorable effect on the shock elasticity of the clutch and the reliable prevention of notch stresses at the rope deflection points.

One embodiment of the invention, in which the spring parts consist of an elastomer material, has proven to be particularly advantageous designwise because such spring parts are relatively simple to modify with respect to both their elasticity and the clutch design itself. It has proven expedient to recess the spring parts in appropriate depressions or recesses of the respective clutch ring. In this way, they can be fixed locally without special fastening means so that they will not change their position when stressed obliquely in tension.

In some cases, it is possible to interconnect the spring parts of the individual rope strands to form an elastic ring but, for such a design, special measures must be taken so that neither this ring nor one of the rope strands can change the position once given to it. A better solution has proven to be one in which the two rope strands are each mounted in one common spring part, since, from the aspect of their size, these spring parts are more easily handled in the production of the clutch than individual spring parts for each rope strands. In addition, they can be designed simply and fixed locally to the clutch ring by simple means, such as, by lateral stops in the clutch ring, or by providing appropriately shaped depressions in the clutch ring.

It is advantageous in special cases, particularly where clutches with extraordinarily great shock loads and/or torsion angles are involved, to provide, as a spring part, a metal spring holding the respective rope strand in contact area to the respective clutch ring in lateral directions.

Accordingly, it is an object of the invention to provide a rotation-elastic, shock and vibration damping clutch which comprises an outer ring part, with an inner ring part arranged within the outer ring part, and each of the ring parts having a generally axially extending aperture therethrough at a plurality of equally circumferentially spaced locations and including an elastic pressure pad of arc-shaped cross-section extending between the inner and outer ring portions and having respective ends abutting against the respective sides of the inner and outer ring portions adjacent each of the apertures with at least one elastic rope extending through the elastic pressure pad and through each of the apertures and being evenly distributed around the circumference of the rings and spring means resiliently supporting the rope adjacent each of the apertures so that they do not touch the ring in any of the areas bounding the apertures.

A further object of the invention is to provide a rotation-elastic, shock and vibration damping clutch which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 4 is a view similar to FIG. 1 of another embodiment of the invention;

FIG. 5 is a section taken along the line D—D of FIG. 4;

FIG. 6 is a view similar to FIG. 3 taken in the direction of the arrow C of FIG. 2 of another embodiment of the invention; and FIG. 7 is a section taken along the line F—F of FIG. 6.

DESCRIPTION OF THE PREFERRED EMBODIMENTS

Figure 1:
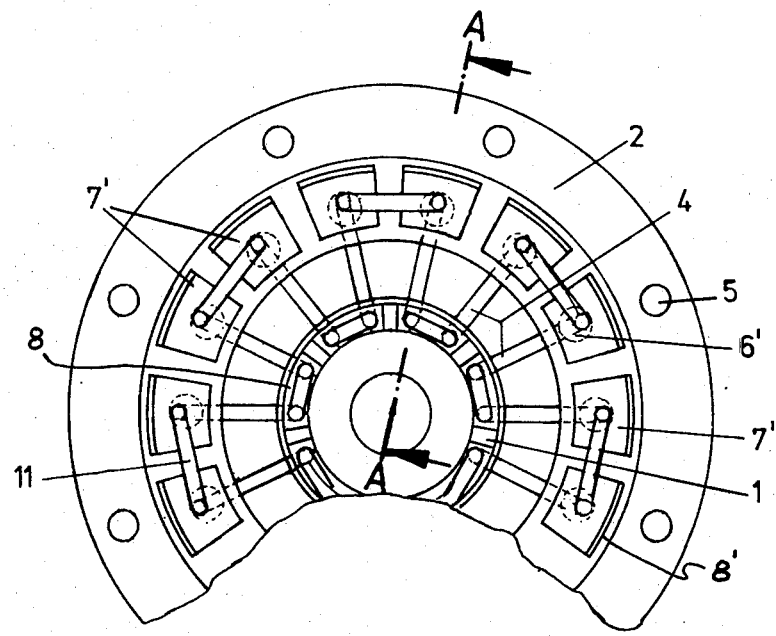
FIG. 1 is a partial end elevational view of a clutch constructed in accordance with the present invention, taken in the direction of the arrow B in FIG. 2.

Referring to the drawings in particular, the invention embodied therein, comprises, a rotation-elastic, shock and vibration damping clutch, which includes an outer ring 2 and an inner ring 1 which is arranged concentrically within an outer ring 2. In addition, an elastic pressure pad 3 of arc-shaped cross-section extends between the inner and outer rings 1 and 2 and it has respective ends in abutting engagement with the respective rings around a rim portion of each which has apertures 6 and 6' defined in the inner and outer rings, respectively.

The rubber-elastic pressure pad interconnecting the inner and the outer clutch rings has been omitted in FIGS. 1, 3, 4 and 6 for better clarity of the drawings.

Figure 2:
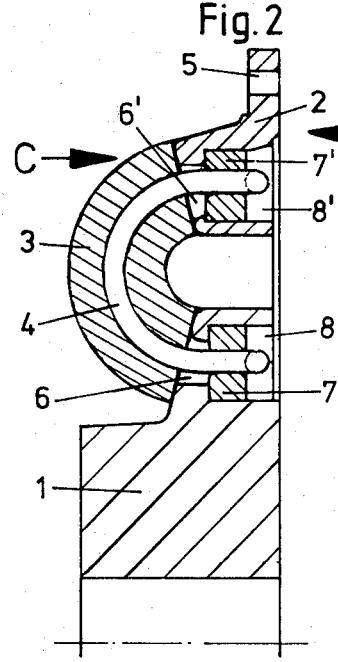
FIG. 2 is a partial section taken along the line A—A of FIG. 1.
Figure 3:
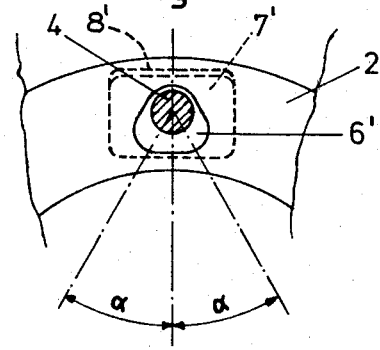
FIG. 3 is a partial elevational and sectional view taken in the direction of the arrow C in FIG. 2.

In the embodiment of FIGS. 1 to 3, the clutch, according to the invention, comprises, an inner clutch ring 1, an outer clutch ring 2 and a cross-sectionally arc-shaped, rubber-elastic pressure pad 3, as well as the rope strands 4, which are evenly distributed over the circumference of the clutch. In a manner known per se, rope strands 4 are formed by a plastic connecting rope pulled continuously through all openings 6 provided therefor in the inner clutch ring 1 and openings 6' provided in the outer clutch ring 2, and embedded in the pressure pad 3.

Holes 5 for screws are provided in the outer clutch ring 2 by means of which the clutch is fastened in a usual manner to a machine part to be driven (not shown). The openings 6 and 6' define passages through which the rope strands 4 are pulled in both inner clutch ring 1 and outer clutch ring 2. The inner ring 2 is fastened in a manner known per se to a driving shaft (not shown). The size and shape of the openings 6, 6' (see FIG. 3) are such that the rope strands 4 will not contact their walls, evan at the maximum positive or negative, torsion angle of the clutch. Each rope strand 4 is supported, in an elastically yielding manner, in the area of the respectively associated openings 6, 6' by a spring part 7 or 7' of elastomer material and retained so as to be largely immovable in lateral directions. To secure the spring parts 7 and 7' themselves against shifting and for reasons of space, and to prevent them from projecting beyond the outside surfaces of the clutch rings 1 and 2, they are recessed in the associated rings in depressions 8 and 8', respectively.

The embodiment of FIGS. 4 and 5 differs in essence from that of FIGS. 1 to 3 in that two rope strands 4 are each mounted in one common spring part 9. Each spring part 9 is recessed in a clutch ring 12 in the same manner as the spring parts 7 in the clutch ring 2. Deepened seating chambers or recesses 10 accommodate the spring parts 9 and, at the same time, prevent them from changing their position. Reference number 11 designates the rope sections of rope forming strands 4, extending from one opening 6 to the next opening 6.

The embodiment according to FIGS. 6 and 7 shows in cutaway view of a clutch ring 13, similar to directional view C in FIG. 2, how a spring part 15, consisting of a metal spring inserted in the clutch ring 13 may be designed for the support of a rope strand 4. Due to the shape of the spring part 15, the rope strand 4 is retained in lateral directions, on the one hand (See FIG. 6), and by curving the spring part 15 like a saddle in the contact area of the rope strand 4 (see FIG. 7), the strand is guided without squeezing and curves across the spring part 15 and through the chamber 14 into the pressure pad 3 safe from contact with the walls of the opening 6.

While specific embodiments of the invention have been shown an described in detail to illustrate the application of the principles of the invention, it will be understood that the invention may be embodied otherwise without departing from such principles.

What is claimed is:

1. A rotation-elastic, shock and vibration damping clutch, comprising, an outer ring part, an inner ring part arranged within said outer ring part, each of said outer and inner ring parts having a plurality of generally axially extending apertures therethrough which are arranged in circumferentially spaced locations, an elastic pressure pad of arc-shaped cross-section extending between said inner and outer ring portions and having respective ends abutting against respective sides of said inner and outer ring portions around each of the respective apertures, at least one non-elastic rope having a diameter substantially smaller than that of said apertures extending through said elastic pressure pad and being connected thereto and also extending through each of the respective apertures and being evenly distributed around the circumference of said rings, and spring means resiliently supporting said rope adjacent each of said apertures so that said rope does not touch said ring parts in any areas bounding the apertures.

2. A rotation-elastic, shock and vibration damping clutch, as claimed in claim 1, wherein said spring means comprises an elastic member engaged with the respective ring in each of the apertures.

3. A rotation-elastic, shock and vibration damping clutch, as claimed in claim 2, wherein each of said inner and outer ring parts are recessed around said apertures, said ring means elastic member being engaged in the recessed portion of said clutch rings.

4. A rotation-elastic, shock and vibration damping clutch, as claimed in claim 1, wherein said spring means comprises an elastic member engaged in each of the apertures, said at least one non-elastic rope comprising two rope strands, each mounted on one resilient member.

5. A rotation-elastic, shock and vibration damping clutch, as claimed in claim 1, wherein said spring means comprises a resilient member disposed in the aperture, having an opening therethrough, through which the rope extends.

6. A rotation-elastic, shock and vibration damping clutch, comprising, an outer ring part, an inner ring part arranged within said outer ring part, each of said outer and inner ring parts having a plurality of generally axially extending apertures therethrough which are arranged in circumferentially spaced locations, an elastic pressure pad of arc-shaped cross-section extending between said inner and outer ring portions and having respective ends abutting against respective sides of said inner and outer ring portions around each of the respective apertures, at least one non-elastic rope having a diameter substantially smaller than that of said apertures extending through said elastic pressure pad and being connected thereto and also extending through each of the respective apertures and being evenly distributed around the circumference of said rings, and spring means resiliently supporting said rope adjacent each of said apertures so that said rope does not touch said ring parts in any areas bounding the apertures, said spring means comprising a continuous spring member bearing against the walls of each aperture, and having a recess portion engaging the rope and holding it in position within each apertures at a spaced location from the walls bounding the aperture.

7. A rotation-elastic, shock and vibration damping clutch, as claimed in claim 6, wherein each said elastic spring member comprises a continuous spring member having leg portions which are in opposed relationship and which are spring-loaded within each aperture and hold said spring member in each aperture, each spring member having an intermediate portion with a rounded part engaging around the rope with a bottom wall which is curved upwardly against said rope.

* * * * *

UNITED STATES PATENT AND TRADEMARK OFFICE
CERTIFICATE OF CORRECTION

PATENT NO. : 4,296,853
DATED : October 27, 1981
INVENTOR(S) : Curt Krönert

It is certified that error appears in the above—identified patent and that said Letters Patent is hereby corrected as shown below:

On the Title Page, Item [22], "Oct. 16, 1979" should read --- Oct. 12, 1979 ---.

Signed and Sealed this

Twelfth Day of January 1982

[SEAL]

Attest:

GERALD J. MOSSINGHOFF

*Attesting Officer*     *Commissioner of Patents and Trademarks*